US012672161B2

(12) United States Patent
Fan et al.

(10) Patent No.: US 12,672,161 B2
(45) Date of Patent: Jun. 30, 2026

(54) METHOD AND DEVICE FOR PROCESSING LOGICAL CHANNEL PRIORITY, STORAGE MEDIUM, AND TERMINAL

(71) Applicant: BEIJING UNISOC COMMUNICATIONS TECHNOLOGY CO., LTD., Beijing (CN)

(72) Inventors: Huifang Fan, Shanghai (CN); Xing Liu, Shanghai (CN); Xiangxin Gu, Shanghai (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 358 days.

(21) Appl. No.: 17/629,248

(22) PCT Filed: Apr. 27, 2020

(86) PCT No.: PCT/CN2020/087196
§ 371 (c)(1),
(2) Date: Jan. 21, 2022

(87) PCT Pub. No.: WO2021/012739
PCT Pub. Date: Jan. 28, 2021

(65) Prior Publication Data
US 2022/0272713 A1     Aug. 25, 2022

(30) Foreign Application Priority Data
Jul. 22, 2019     (CN) ......................... 201910661929.1

(51) Int. Cl.
*H04W 72/56*     (2023.01)

(52) U.S. Cl.
CPC ................................... *H04W 72/56* (2023.01)

(58) Field of Classification Search
CPC ...................................................... H04W 72/56
See application file for complete search history.

(56) References Cited

U.S. PATENT DOCUMENTS

2010/0272045 A1     10/2010 Hsu
2011/0170495 A1      7/2011 Earnshaw et al.
(Continued)

FOREIGN PATENT DOCUMENTS

CN          103945540 A      7/2014
CN          107079530 A      8/2017
(Continued)

OTHER PUBLICATIONS

3rd Generation Partnership Project et al., "Medium Access Control (MAC) protocol specification", 3GPP TS 36.321 V14.11.0, Jun. 2019, 110 pages.
(Continued)

*Primary Examiner* — Won Tae C Kim
(74) *Attorney, Agent, or Firm* — CANTOR COLBURN LLP

(57)          ABSTRACT

A method and device for a Logical Channel Prioritization (LCP) procedure, a storage medium, and a terminal are provided. The method includes: selecting a transmission target based on a logical channel priority and a token value, wherein the transmission target comprises a transmission resource and/or a Destination; and performing the LCP procedure based on the selected transmission target.

20 Claims, 3 Drawing Sheets the UE selects a transmission target based on a logical channel priority and a token value, wherein the transmission target includes a transmission resource and/or a Destination ⟩ S101 the UE performs the LCP procedure based on the selected transmission target ⟩ S102

(56) References Cited

U.S. PATENT DOCUMENTS

| | | | |
|---|---|---|---|
| 2017/0257876 A1 | 9/2017 | Loehr et al. | |
| 2018/0070372 A1 | 3/2018 | Yi et al. | |
| 2018/0124811 A1 | 5/2018 | Yi et al. | |
| 2018/0317123 A1 | 11/2018 | Chen et al. | |
| 2019/0028924 A1* | 1/2019 | Kim ..................... | H04W 28/06 |
| 2019/0124015 A1 | 4/2019 | Loehr et al. | |
| 2020/0236581 A1 | 7/2020 | Shang et al. | |
| 2021/0153065 A1* | 5/2021 | Adjakple .............. | H04W 76/14 |

FOREIGN PATENT DOCUMENTS

| | | | |
|---|---|---|---|
| CN | 107439049 A | 12/2017 | |
| CN | 109314841 A | 2/2019 | |
| CN | 109548078 A | 3/2019 | |
| EP | 3485689 A1 | 5/2019 | |
| JP | 2017201794 A | 11/2017 | |
| WO | 2018016157 A1 | 1/2018 | |

OTHER PUBLICATIONS

JPO Notice of Reasons for Refusal for corresponding JP Application No. 2022-504258; Mailing Date, Feb. 6, 2023.
CNIPA First Office Action for corresponding CN Application No. 201910661929.1; Dated Nov. 20, 2020.
EPO Extended European Search Report for corresponding EP Application No. 20842994.4; Issued Jul. 18, 2022.
Qualcomm Europe "Text Proposal for UL Logical Channel Prioritisation with Segmentation Optimisation"; 3GPP TSG-RAN WG2 #61; R2-081064; Feb. 11-15, 2008; 4 pages.
Huawei, "Reliability enhancements for NR sidelink broadcast", 3GPP TSG-RAN WG2 Meeting #104; R2-1816516; Nov. 12-16, 2018; 4 pages.
International Search Report for International Application No. PCT/CN2020/087196; Mailing Date, Jul. 29, 2020.

* cited by examiner

METHOD AND DEVICE FOR PROCESSING LOGICAL CHANNEL PRIORITY, STORAGE MEDIUM, AND TERMINAL

CROSS REFERENCE TO RELATED APPLICATIONS

This is the U.S. national stage of application No. PCT/CN2020/087196, filed on Apr. 27, 2020. Priority under 35 U.S.C. § 119(a) and 35 U.S.C. § 365(b) is claimed from Chinese Application No. 201910661929.1, filed Jul. 22, 2019, the disclosure of which is also incorporated herein by reference.

TECHNICAL FIELD

The present disclosure generally relates to wireless communication technology field, and more particularly, to a method and device for a Logical Channel Prioritization (LCP) procedure, a storage medium, and a terminal.

BACKGROUND

Based on direct communication, the 3rd Generation Partnership Project (3GPP) began to support a Vehicle-to-Everything (V2X) communication in the Rel-14, or, a LTE V2X, and in the Rel-15, it has been enhanced, that is an enhanced V2X (eV2X).

Currently, the 3GPP is working on introducing the V2X in the 5G NR. Due to differences between the NR V2X and the LTE V2X, if the NR V2X copies the LTE V2X, there may be a situation where logical channels are starved.

SUMMARY

Embodiments of the present disclosure provide a method to enhance a Logical Channel Prioritization (LCP) to prevent logical channels with lower prioritization from being starved effectively.

In an embodiment of the present disclosure, a method for a LCP procedure is provided, the method includes: selecting a transmission target based on a logical channel priority and a token value, wherein the transmission target includes a transmission resource and/or a Destination; and performing the LCP procedure based on the selected transmission target.

In an embodiment of the present disclosure, a storage medium is provided, the storage medium having computer instructions stored therein, wherein once the computer instructions are executed, the method based on above embodiments is performed.

In an embodiment of the present disclosure, a terminal is provided, the terminal includes a memory and a processor, wherein the memory has computer instructions stored therein, and the method based on above embodiments is performed, once the processor executes the computer instructions.

DETAILED DESCRIPTION

Figure 1:
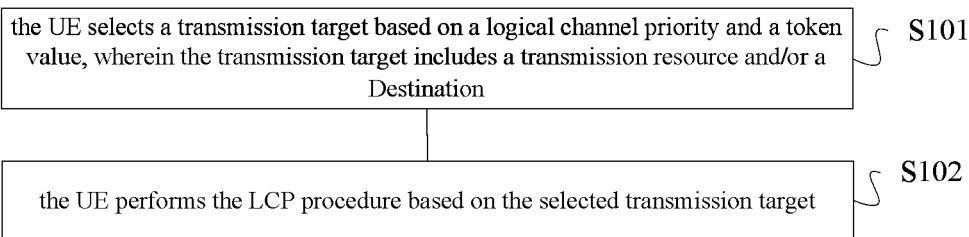
FIG. 1 schematically illustrates a flowchart of a method for a LCP procedure according to an embodiment of the present disclosure.

As mentioned in background, in the existing technology, there is a need for preventing logical channels from being starved to death during performing a LCP procedure.

In the Release 12 (Rel-12), the Long Term Evolution (LTE) introduces a Proximity-based Services (ProSe) direct communication (Device-to-Device, D2D for short). A plurality of User Equipments (UE) may communicate directly through PC5 interfaces. The PC5 interfaces are direct interfaces between UEs.

The ProSe direct communication has two resource allocation modes, one is a Scheduled Resource Allocation which is configured by a base station through a dedicated signaling; the other is an Autonomous Resource Selection, a base station can provide a resource pool for the direct communication for a UE through a system message or a Radio Resource Control (RRC) signaling, and the UE selects a resource for the direct communication from the resource pool. If Transmitter UE is not within the coverage of the network, the UE selects a transmission resource for the direct communication from the preconfigured resource pool by the Autonomous Resource Selection.

The LTE Rel-14 V2X is designed on the basis of the D2D of the Rel-12 and the Rel-13 and remains the PC5 interface as a Sidelink interface.

A user plane protocol of the PC5 interface in the LTE V2X consists of a Packet Data Convergence Protocol (PDCP), a Radio Link Control (RLC) layer, a Medium Access Control (MAC) layer and a Physical Layer (PHY). The MAC layer is mainly responsible for a radio resource selection, a packet filtering and priority procedure of an uplink transmission and a Sidelink transmission of the UE, that is, a Logical Channel Prioritization (LCP) procedure. In the LTE V2X communication, only data transmission by a broadcast is supported, and there is no requirement on a data rate for a V2X service, therefore, a starvation avoidance mechanism is not supported in the LCP procedure. Moreover, since the Sidelink communication occurs directly between a plurality of users, and service data does not need to pass through a base station and a core network. In order to reduce the complexity of implementation, in the LCP procedure, Sidelink services belonging to different Destinations cannot be multiplexed into one MAC Protocol Data Unit (PDU), therefore, the LCP procedure of the LTE V2X is performed as following S0, S1, S2 and S3.

In S0, a UE obtains a resource from a base station or selects a resource by itself, if a plurality of resources is obtained at a same time, the UE selects one of the plurality of resources to perform the following data multiplexing processing;

In S1, the UE selects a Destination corresponding to a logical channel with the highest priority among all logical channels with data that is available for transmission as a Destination of the LCP procedure.

In S2, the UE allocates the resource to the logical channel with the highest priority and having data that is available for transmission among all logical channels belonging to the selected Destination.

In S3, after S2, if there are the transmission resource remaining, the UE allocates the remaining transmission resource to the logical channels belonging to the selected Destination in a descending order of the logical channel priority until the transmission resources is exhausted or until the transmission of the data that is available for transmission by the logical channel is completed.

Currently, the 3GPP is working on introducing the V2X in the 5G NR. Because the 5G system can provide a larger bandwidth and a lower latency, it can better meet the service requirement of the V2X. The 3GPP supports the NR V2X to transmit the V2X services by unicast, groupcast or broadcast. And the NR V2X is mainly aimed at advanced V2X applications, including four types of application scenarios, that is, fleet, advanced driving, extended sensors and remote driving scenarios. To support the above application scenarios, the NR V2X has been enhanced accordingly.

A Quality of Services (QoS) of the NR V2X has requirements on a data rate, therefore, in order to meet a minimum data rate of a Guaranteed Bit Rate (GBR) service, there is a need to introduce a starvation avoidance mechanism. The starvation avoidance mechanism introduces a concept of Prioritized Bit Rate (PBR), that is, before allocating a resource to logical channels, configure the data rate of each logical channel, thereby providing a minimum data rate of a GBR for each logical channel, and avoiding logical channels with low priority "being starved". The MAC layer uses an algorithm similar to a token bucket to realize a multiplexing of the MAC layer, wherein a Bucket Size Duration (BSD) determines the "depth" of the token bucket. The UE maintains a variable $B_j$ for each logical channel j, and $B_j$ indicates a number of tokens currently available in the token bucket. $B_j$ is initialized to 0 when the logical channel is established, and in each Transmission Time Interval (TTI), $B_j$ increases by PBR×TTI.

After the starvation avoidance mechanism is introduced to the NR V2X, determining a transmission target according to the method in the existing LTE V2X, may lead to the situation where the PBR of the logical channel corresponding to the selected transmission target have been satisfied, that is, there may be no remaining token in the logical channel, which may cause the priority to be relatively low, and the GBR service thus cannot obtain the transmission resource.

In addition, in the NR V2X, at least for a service of a Sidelink broadcast and a service of a Sidelink groupcast, logical channels with different Destinations are not allowed to be multiplexed into a same MAC PDU. Therefore, even after the starvation avoidance mechanism is introduced, it is unavoidable the scenario that a service with a small data packet and a high generation frequency always occupies a transmission resource, which may cause logical channels of other Destinations to be starved.

In embodiments of the present disclosure, a method for a LCP procedure is provided, including: selecting a transmission target based on a logical channel priority and a token value, wherein the transmission target includes a transmission resource and/or a Destination; and performing the LCP procedure based on the selected transmission target. According to the embodiment of the present disclosure, the logical channel priority and the token value (or a variable $B_j$) can be considered together when selecting the transmission target for performing a LCP procedure. A consideration of the logical channel priority is mainly to meet a Quality of Services (QoS) requirement of a service, and a consideration of the token value is mainly to prevent a same transmission target from being selected every time, thereby avoiding a situation where logical channels with low priority being starved to death when performing the LCP procedure.

In order to clarify the object, characteristic and advantages of embodiments of the present disclosure, the embodiments of present disclosure will be described clearly in detail in conjunction with accompanying drawings.

FIG. 1 schematically illustrates a flowchart of a method for a LCP procedure according to an embodiment of the present disclosure, the method may be executed by a terminal, for example, executed by a 5G V2X UE.

Specifically, the method for a LCP procedure may include the following S101 and S102.

In S101, the UE selects a transmission target based on a logical channel priority and a token value, wherein the transmission target includes a transmission resource and/or a Destination.

In S102, the UE performs the LCP procedure based on the selected transmission target.

More specifically, the UE may determine each logical channel, a logical channel priority of the logical channel, and a token value of the logical channel (or, variable $B_j$).

In S101, the UE may select a transmission resource for transmitting a MAC PDU based on the logical channel priority and the token value; or the UE may select a Destination based on the logical channel priority and the token value; or the UE may select the transmission resource and the Destination based on the logical channel priority and the token value.

In S102, after selecting the transmission target (such as the transmission resource and/or the Destination), the UE may continue to perform the LCP procedure. Those skilled in the art should understand that the logical channel corresponding to the transmission target is a logical channel in the LCP procedure.

In an embodiment, the transmission target includes the transmission resource, after determining that each transmission resource that can transmit the MAC PDU, the UE determines apriority and a token value of a logical channel that can be transmitted by each transmission resource, respectively, and then selects a transmission resource based on the priority and the token value of the logical channel that can be transmitted by the transmission resource. Specifically, when selecting the transmission resource, the UE selects a transmission resource, which can transmit following logical channel with a highest priority, having data that is available for transmission, and whose token value is greater than X, as the transmission resource, wherein X≥0.

In another embodiment, the transmission target includes the Destination, the UE determines each logical channel which has data that is available for transmission first, after that, the UE selects a Destination associated with a logical channel with a highest priority among all logical channels, and whose $B_j$ is greater than X, as the Destination, wherein X≥0.

In a specific implementation, the value of X may be predefined; or the value of X may be configured by a base station, for example, the base station may pre-configure the value of X based on the PBR of each logical channel. Or the UE may determine the value of X based on the PBR of each logical channel and the data that is available for transmission on each logical channel.

Further, for all logical channels with $B_j \geq 0$ in a same destination, the UE may group a packet (such as a MAC PDU packet) in a descending order of logical channel priority. After that, sizes of all the MAC Service Data Units (SDU) multiplexed into the MAC PDU packet from the logical channel j are subtracted from the variable $B_j$ of each logical channel j, wherein j represents a logical channel identifier which may be a non-negative integer.

Further, if a size of the transmission resource is greater than an amount of data that is available for transmission, the UE may additionally reduce the token value of each logical channel participating in the MAC PDU multiplexing. The amount of data that is available for transmission refers to a total amount of data that is available for transmission in all logical channels participating in MAC PDU multiplexing.

In a specific implementation, the UE may determine a total amount of the additionally subtracted token values of all logical channels participating in the MAC PDU multiplexing as a difference between the size of the transmission resource and the amount of data that is available for transmission. For each logical channel among all logical channels participating in the MAC PDU multiplexing, the UE may determine the additionally subtracted $B_j$ of the logical channel as a quotient between the total amount of token values and channel numbers of all logical channels, that is, the value of additionally subtracted $B_j$ of each logical channel is the same.

Or, for each logical channel among all logical channels participating in the MAC PDU multiplexing, the UE may reduce $B_j$ of each logical channel according to a SDU ratio of each logical channel participating in MAC PDU multiplexing, and the additionally subtracted token value of each logical channel decreases as $B_j$ of the logical channel participating in the MAC PDU multiplexing increases.

Figure 2:
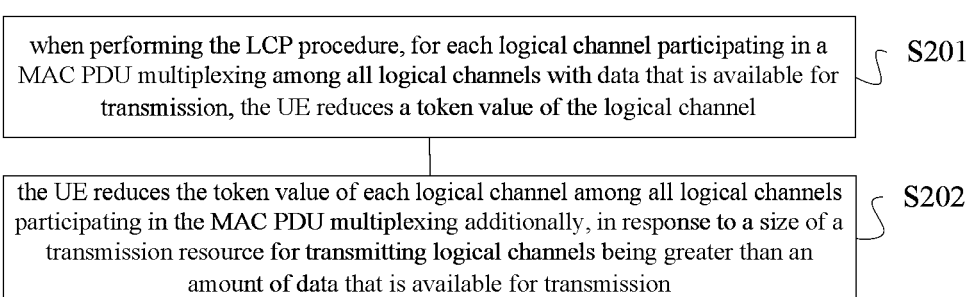
FIG. 2 schematically illustrates a flowchart of a method for a LCP procedure according to another embodiment of the present disclosure, FIG. 3 schematically illustrates a structural diagram of a device for a LCP procedure according to an embodiment of the present disclosure.

FIG. 2 schematically illustrates a flowchart of a method for a LCP procedure according to another embodiment of the present disclosure, the method may be executed by a terminal, for example, executed by a 5G UE.

Specifically, the method for a LCP procedure may include the following S201 and S202.

In S201, when performing the LCP procedure, for each logical channel participating in a MAC PDU multiplexing among all logical channels with data that is available for transmission, the UE reduces a token value of the logical channel.

In S202, the UE reduces the token value of each logical channel among all logical channels participating in the MAC PDU multiplexing additionally, in response to a size of a transmission resource for transmitting logical channels being greater than an amount of data that is available for transmission.

The amount of data that is available for transmission refers to a total amount of data that is available for transmission in all logical channels participating in the MAC PDU multiplexing.

More specifically, when the UE performs the LCP procedure, the UE determines each logical channel participating in the MAC PDU multiplexing among all logical channels have data that is available for transmission first.

In an embodiment, the UE may determine a transmission target based on a logical channel priority, and the transmission target may be a transmission resource for transmitting the MAC PDU. And the UE may perform the LCP procedure for the logical channel based on the transmission target.

In another embodiment, the UE may determine a transmission target based on the logical channel priority and the token value, and the transmission target includes a transmission resource and/or a Destination. And the UE may perform the LCP procedure for the logical channel based on the transmission target.

Specifically, the transmission target includes the transmission resource, after determining each transmission resource that can transmit the MAC PDU, the UE determines apriority and a token value of a logical channel that can be transmitted by each transmission resource, respectively, and then selects the transmission resource based on the priority and the token value of the logical channel that can be transmitted by the transmission resource. Furthermore, when selecting the transmission resource, the UE selects a transmission resource, which can transmit following logical channel with a highest priority, having data that is available for transmission, and whose token value is greater than X, as the transmission resource, wherein X≥0.

Or, if the transmission target includes the Destination, the UE may select a Destination associated with a logical channel with a highest priority among all logical channels whose $B_j$ is greater than X as the Destination after determining each logical channel which has data that is available for transmission, and X≥0. Further, the LCP procedure can be performed on each logical channel.

In a specific implementation, the value of X may be determined by following ways: predefined by a protocol, such as the 3GPP TS38.321 protocol, or the value of X may be pre-configured by a base station based on a PBR of each logical channel; or the value of X may be determined by the UE based on the PBR of each logical channel and data that is available for transmission on each logical channel.

Furthermore, when performing the LCP procedure for each logical channel, the UE may reduce the token value of each logical channel participating in the MAC PDU multiplexing.

In S202, if a size of the transmission resource for transmitting the logical channel is greater than an amount of data that is available for transmission, the UE may additionally reduce the token value of each logical channel among all logical channels participating in the MAC PDU multiplexing. In a practical application, the UE may additionally reduce the token value of each logical channel participating in the MAC PDU multiplexing when a size of the transmission resource is far greater than the amount of data that is available for transmission.

In a specific implementation, the UE may determine a total amount of the additionally subtracted token values of all logical channels participating in the MAC PDU multiplexing as a difference between the size of the transmission resource and the amount of all data that is available for transmission.

In an embodiment, for each logical channel among all logical channels participating in the MAC PDU multiplexing, the UE may determine the additionally subtracted token value of the logical channel as a quotient between the total amount of token values and channel numbers of all logical channels.

In another embodiment, for each logical channel among all logical channels participating in the MAC PDU multiplexing, the additionally subtracted token value of each logical channel decreases as the token value of the logical channel participating in the MAC PDU multiplexing increases.

The following describes in detail with specific embodiments.

Embodiment one: in a LCP procedure, a UE may select a transmission resource first; the transmission resource refers to a radio resource for transmitting a PDU of a MAC layer. When selecting the transmission resource, the UE may receive a plurality of candidate transmission resources from a base station, or the UE may obtain a plurality of candidate transmission resources from a resource pool. Meanwhile, the UE may select one of the pluralities of candidate transmission resources as the transmission resource for transmitting data. When selecting the transmission resource, the UE may consider both the priority order of a logical channel which can be transmitted and whether $B_j$ of the logical channel is greater than X. That is, the UE selects a transmission resource that can transmit a logical channel which satisfies following conditions, and the conditions that the logical channel needs to meet include: $B_j \geq X$, and the priority of the logical channel is the highest.

The value of X may be set to 0 or may be set to any value greater than 0, for example, the value of X may be set to 30% of the PBR value. And the value of X may be determined by the UE based on the PBR value configured for each logical channel and the arrival of actual data packet; or the value of X may be configured by the network based on the PBR of each logical channel; or values of X of all logical channels are preset to a same threshold.

Afterwards, the UE may perform subsequent LCP procedure on the selected transmission resource. For example, the UE may group all logical channels with $B_j > 0$ and have data that is available for transmission into a MAC PDU packet in a descending order of priority, and a transmission resource allocated to each logical channel only meet a PBR requirement of the logical channel. Afterwards, the UE may reduce $B_j$ value for each logical channel j, wherein j is a non-negative integer, and a subtracted value is equal to the above-mentioned value of all MAC SDUs multiplexed into the MAC PDU packet. Furthermore, if the transmission resource is still remaining, the UE may no longer consider $B_j$, but allocate the remaining transmission resource to other logical channels based on the logical channel priority, so that the other logical channels can transmit the data that is available for transmission on the other logical channels.

Embodiment two: after determining a transmission resource for a LCP procedure, the UE may determine a Destination for data that is available for transmission in the LCP procedure, that is, determine a Destination. Specifically, the UE may select all logical channels with $B_j$ greater than X from all logical channels with data, and record the logical channels with $B_j$ greater than X as a logical channel set A. And then the UE may select a Destination corresponding to a logical channel with the highest priority in the logical channel set A as a Destination of the LCP procedure, and j is a non-negative integer.

The value of X may be set to 0 or may be set to any value greater than 0, for example, the value of X may be set to 30% of the PBR value. And the value of X may be determined by the UE based on the PBR value configured for each logical channel and the arrival of actual data packet; or the value of X may be configured by the network based on the PBR of each logical channel; or values of X of all logical channels are preset to a same threshold.

Afterwards, the UE may perform subsequent LCP procedure on the selected transmission resource. For example, the UE may group all logical channels with $B_j > 0$ in a same Destination into a MAC PDU packet in a descending order of priority, and a transmission resource allocated to each logical channel only meet a PBR requirement of the logical channel. Afterwards, the UE may reduce $B_j$ value for each logical channel j, and a subtracted value is equal to the above-mentioned value of all MAC SDUs multiplexed into the MAC PDU packet. Furthermore, if the transmission resource is still remaining, the UE may no longer consider $B_j$, but allocate the remaining transmission resource to other logical channels corresponding to the Destination based on the logical channel priority, so that the other logical channels can transmit the data that is available for transmission on the other logical channels.

Embodiment three: after selecting a transmission target (for example, a UE may select the transmission target based on a logical channel priority according to an existing protocol), if the UE finds that the allocated transmission resource is not fully utilized, the UE may penalize $B_j$ (j is a non-negative integer), and the specific processing may be as following S0, S1, S2 and S3.

In S0, the UE obtains a transmission resource and selects a Destination for data multiplexing.

In S1, the UE groups all logical channels with a same Destination into a MAC PDU packet in a descending order of priority. In an embodiment, a transmission resource allocated to each logical channel may only meet a PBR requirement of the logical channel.

In S2, the UE reduces $B_j$, and a subtracted token value for each logical channel j is equal to values of all MAC SDUs of each logical channel j multiplexed into the MAC PDU packet in S1.

In S3, if the transmission resource is still remaining, the UE may no longer consider $B_j$, but allocate the remaining transmission resource to other logical channels corresponding to the Destination based on the logical channel priority.

It should be noted that, in S3, after multiplexing all data to be transmitted in a logical channel corresponding to the selected transmission target into the transmission resource, the UE may compare the relative size of a total MAC SDU multiplexed into the MAC PDU and a transmission resource used by a current LCP procedure. If the used transmission resource is far greater than a data size of the total MAC SDU multiplexed into the MAC PDU, the UE may additionally subtract the token value of each logical channel. Specifically, the additionally subtracted token values for different logical channels can be determined in two ways.

(1) An additionally subtracted total token value of all logical channels participating in the multiplexing is equal to that the transmit resource minus the data size of the total MAC SDU multiplexed into the MAC PDU, and the additionally subtracted token value of each logical channel is a same value. That is, the additionally subtracted token value of each logical channel participating in the LCP procedure is equal to the additionally subtracted total token value divided by a number of all logical channels participating in the LCP procedure.

For example, the transmission resource includes 1000 bytes, and the data size of the total MAC SDU multiplexed into the MAC PDU includes 500 bytes, and the additionally subtracted total token value of each logical channel participating in the multiplexing is equal to 500 bytes (1000 bytes−500 bytes=500 bytes). Assuming that a number of all logical channels participating in the LCP procedure is 2, and the 2 numbers of the logical channels are denoted as a LCH 1 and a LCH 2, in this case, the additionally subtracted token value of the LCH 1 and the LCH 2 is 250 bytes, respectively.

(2) An additionally subtracted total token value of all logical channels participating in the multiplexing is equal to that the transmit resource minus the data size of the total MAC SDU multiplexed into the MAC PDU, and the additionally subtracted value from the token value of each logical channel is allocated in proportion to a size of the total MAC SDUs of the logical channels multiplexed into the MAC PDU. That is, the larger a ratio of MAC SDUs of a logical channel multiplexed into the MAC PDU, the smaller a token value additionally subtracted from the logical channel.

For example, the transmission resource includes 1000 bytes, and the data size of the total MAC SDU multiplexed into the MAC PDU includes 500 bytes, and the additionally subtracted total token value of each logical channel partici-pating in the multiplexing is equal to 500 bytes (1000 bytes−500 bytes=500 bytes). Assuming that a number of all logical channels participating in the LCP procedure is 2, and the 2 numbers of the logical channels are denoted as a LCH 1 and a LCH 2, wherein a MAC SDU of the LCH 1 multiplexed in the LCP procedure is 300 bytes, and a MAC SDU of the LCH 2 multiplexed in the LCP procedure is 200 bytes. In this case, the additionally subtracted token value of the LCH1 is 200 bytes, and the additionally subtracted token value of the LCH2 is 300 bytes.

Embodiment four: after selecting a transmission target, if a UE finds that an allocated transmission resource is not fully utilized, the UE may penalize $B_j$ (j is a non-negative integer), and the specific processing may be as following S0, S1, S2 and S3.

In S0, the UE selects the transmission target and obtains the transmission resource and a Destination for a data multiplexing based on the consideration of a logical channel priority and $B_j$.

In S1, the UE groups all logical channels with $B_j>0$ and with a same Destination into a MAC PDU packet in a descending order of priority. In an embodiment, a transmission resource allocated to each logical channel may only meet a PBR requirement of the logical channel.

In S2, the UE reduces $B_j$, and a subtracted token value for each logical channel j is equal to values of all MAC SDUs of each logical channel j multiplexed into the MAC PDU packet in S1.

In S3, if the transmission resource is still remaining, the UE may no longer consider $B_j$, but allocate the remaining transmission resource to other logical channels correspond-ing to the Destination based on the logical channel priority.

It should be noted that, in S3, after multiplexing all data that is available for transmission in a logical channel cor-responding to the selected transmission target into the trans-mission resource, the UE may compare the relative size of a total MAC SDU multiplexed into the MAC PDU and a transmission resource used by the current LCP procedure. If the used transmission resource is far greater than a data size of the total MAC SDU multiplexed into the MAC PDU, the UE may additionally subtract the token value of each logical channel. Specifically, the additionally subtracted token val-ues for different logical channels can be determined in two ways.

(1) An additionally subtracted total token value of all logical channels participating in the multiplexing is equal to that the transmit resource minus the data size of the total MAC SDU multiplexed into the MAC PDU, and the addi-tionally subtracted token value of each logical channel is a same value. That is, the additionally subtracted token value of each logical channel participating in the LCP procedure is equal to the additionally subtracted total token value divided by a number of all logical channels participating in the LCP procedure.

(2) An additionally subtracted total token value of all logical channels participating in the multiplexing is equal to that the transmit resource minus the data size of the total MAC SDU multiplexed into the MAC PDU, and the addi-tionally subtracted value from the token value of each logical channel is allocated in proportion to a size of the total MAC SDUs of the logical channels multiplexed into the MAC PDU. That is, the larger a ratio of MAC SDUs of a logical channel multiplexed into the MAC PDU, the smaller a token value additionally subtracted from the logical chan-nel.

From the above, the embodiments of the present disclo-sure provide a method to enhance a LCP procedure, which can further effectively prevent logical channels correspond-ing to different transmission targets from being starved to death while meeting the GBR and the PBR service require-ments of the V2X communication.

Figure 3:
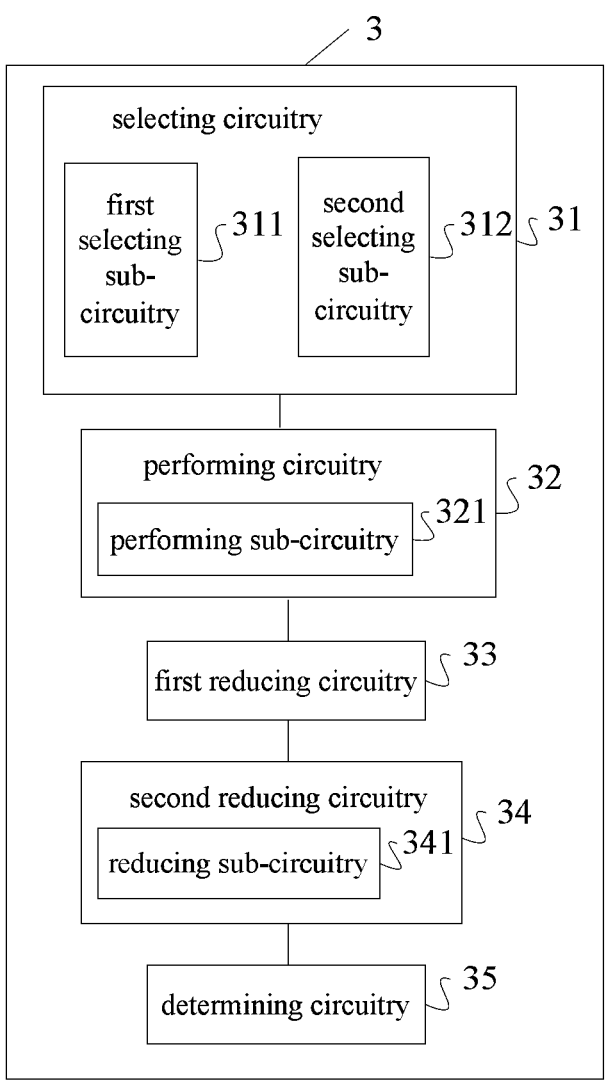

FIG. 3 schematically illustrates a structural diagram of a device for a LCP procedure according to an embodiment of the present disclosure. The device3 for a LCP procedure may be applied to implement the technical solution of the method shown in FIG. 1, which is executed by the terminal. Spe-cifically, the device3 may include: a selecting circuitry 31, which is adapted to select a transmission target based on a logical channel priority and a token value, wherein the transmission target includes a transmission resource and/or a Destination; a performing circuitry 32, which is adapted to perform the LCP procedure based on the selected transmis-sion target.

In some embodiment, the transmission target includes the transmission resource, and the transmission resource is used for transmitting a MAC PDU, the selecting circuitry 31 may include: a first selecting sub-circuitry 311, which is adapted to select a transmission resource, which can transmit fol-lowing logical channel with a highest priority, having data that is available for transmission, and whose token value is greater than X, as the transmission target, wherein X≥0.

In some embodiment, the transmission target includes the Destination, the selecting circuitry 31 may include: a second selecting sub-circuitry 312, which is adapted to select a Destination associated with a logical channel with the high-est priority and whose token value is greater than X as the transmission target among all logical channels which have data that is available for transmission, wherein X≥0.

In some embodiment, a value of X is determined by following ways: predefined by a protocol; or configured; or determined by a User Equipment (UE) based on a Prioritized Bit Rate (PBR) of each logical channel and an amount of data that is available for transmission on each logical channel.

In some embodiment, the device3 may further include: a first reducing circuitry 33, for each logical channel partici-pating in a MAC PDU multiplexing among all logical channels, the first reducing circuitry 33 is adapted to reduce a token value of the logical channel; a second reducing circuitry 34 adapted to reduce the token value of each logical channel participating in the MAC PDU multiplexing addi-tionally, in response to a size of the transmission resource being greater than an amount of data that is available for transmission; wherein the amount of data that is available for transmission refers to a total amount of data that is available for transmission in all logical channels participat-ing in MAC PDU multiplexing.

In some embodiment, the second reducing circuitry 34 may include: a reducing sub-circuitry 341, which is adapted to determine a total amount of the additionally subtracted token values of all logical channels participating in the MAC PDU multiplexing as a difference between the size of the transmission resource and the amount of data that is avail-able for transmission.

In some embodiment, the device 3 may further include: a determining circuitry 35, for each logical channel among all logical channels participating in the MAC PDU multiplex-ing, the determining circuitry 35 is adapted to determine the additionally subtracted token value of the logical channel as a quotient between the total amount of token values and channel numbers of all logical channels.

In a variant embodiment, for each logical channel among all logical channels participating in the MAC PDU multiplexing, the additionally subtracted token value of each logical channel may decrease as the token value of the logical channel participating in the MAC PDU multiplexing increases.

In some embodiment, the performing circuitry 32 may include: a performing sub-circuitry 321, which is adapted to perform the LCP procedure for a logical channel associated with the selected transmission target.

For the principle, specific embodiments, and beneficial effects of the device 3 for a LCP procedure, please refer to the foregoing and the related description of the method shown in FIG. 1, which will not be repeated here.

Figure 4:
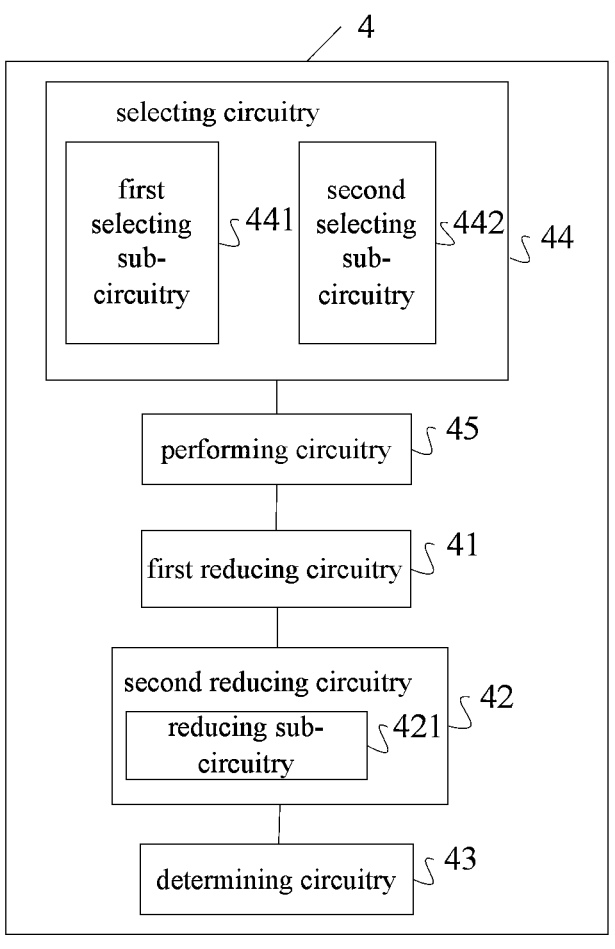
FIG. 4 schematically illustrates a structural diagram of a device for a LCP procedure according to another embodiment of the present disclosure.

FIG. 4 schematically illustrates a structural diagram of a device for a LCP procedure according to another embodiment of the present disclosure. The device4 for a LCP procedure may be applied to implement the technical solution of the method shown in FIG. 2, which is executed by the terminal.

Specifically, the device4 may include: a first reducing circuitry 41, which is adapted to reduce a token value of each logical channel participating in a MAC PDU multiplexing among all logical channels with data that is available for transmission when performing the LCP procedure; a second reducing circuitry 42, if a size of a transmission resource for transmitting logical channels is greater than an amount of data that is available for transmission, the second reducing circuitry 42 is adapted to reduce the token value of each logical channel among all logical channels participating in the MAC PDU multiplexing additionally; wherein the amount of data that is available for transmission refers to a total amount of data that is available for transmission in all logical channels participating in the MAC PDU multiplexing.

In some embodiment, the second reducing circuitry 42 may include: a reducing sub-circuitry 421, which is adapted to determine a total amount of the additionally subtracted token values of all logical channels participating in the MAC PDU multiplexing as a difference between the size of the transmission resource and the amount of data that is available for transmission.

In some embodiment, the device 4 may further include: a determining circuitry 43, for each logical channel among all logical channels participating in the MAC PDU multiplexing, the determining circuitry 43 is adapted to determine the additionally subtracted token value of the logical channel as a quotient between the total amount of token values and channel numbers of all logical channels.

In a variant embodiment, for each logical channel among all logical channels participating in the MAC PDU multiplexing, the additionally subtracted token value of each logical channel may decrease as the token value of the logical channel participating in the MAC PDU multiplexing increases.

In some embodiment, the device 4 may further include: a selecting circuitry 44, which is adapted to select a transmission target based on a logical channel priority and a token value before reducing the token value of the logical channel, wherein the transmission target includes a transmission resource and/or a Destination; and a performing circuitry 45, which is adapted to perform the LCP procedure based on the selected transmission target.

In some embodiment, the transmission target includes the transmission resource, and the transmission resource is used for transmitting a MAC PDU, the selecting circuitry 44 may include: a first selecting sub-circuitry 441, which is adapted to select a transmission resource, which can transmit following logical channel with the highest priority, having data that is available for transmission, and whose token value is greater than X, as the transmission target, wherein X≥0.

In some embodiment, the transmission target includes the Destination, the selecting circuitry 44 may include: a second selecting sub-circuitry 442, which is adapted to selecting a Destination associated with a logical channel with the highest priority whose token value is greater than X as the transmission target among all logical channels which have data that is available for transmission, wherein X≥0.

In some embodiment, a value of X is determined by following ways: predefined by a protocol; or configured; or determined by a User Equipment (UE) based on a Prioritized Bit Rate (PBR) of each logical channel and an amount of data that is available for transmission on each logical channel.

For the principle, specific embodiments, and beneficial effects of the device 4 for a LCP procedure, please refer to the foregoing and the related description of the method shown in FIG. 2, which will not be repeated here.

In an embodiment of the present disclosure, a storage medium having computer instructions stored therein is provided, wherein once the computer instructions are executed, the methods shown in FIG. 1 and FIG. 2 can be performed. In some embodiment, the storage medium may include a non-volatile memory or a non-transitory memory or the like; and the storage medium may also include a ROM, a RAM, a disk or an optical disk or the like.

In an embodiment of the present disclosure, a terminal including a memory and a processor is provided, wherein the memory has computer instructions stored therein, and the methods shown in FIG. 1 and FIG. 2 can be performed, once the processor executes the computer instructions. In some embodiment, the terminal may include a 5G terminal, such as a NR UE.

Although the present disclosure is disclosed as above, the present disclosure is not limited to this. Those skilled in the art can make various changes and modifications without departing from the spirit and scope of the present disclosure. Therefore, the protection scope of the present disclosure should be subject to the scope defined by the claims.

What is claimed is:

1. A method for a Logical Channel Prioritization (LCP) procedure, comprising:

selecting a transmission target based on a logical channel priority and a logical channel token value, wherein the transmission target comprises a Destination, and the logical channel token value is a variable Bj; and performing the LCP procedure based on the selected transmission target.

2. The method according to claim 1, wherein the transmission target further comprises a transmission resource, and the transmission resource is used for transmitting a Medium Access Control (MAC) Protocol Data Unit (PDU), and said selecting the transmission target based on the logical channel priority and the logical channel token value comprises:

selecting a transmission resource, which can transmit following logical channel with the highest priority, having data that is available for transmission, and whose logical channel token value is greater than X, as the transmission target, wherein X≥0.

3. The method according to claim 2, wherein a value of X is:

predefined by a protocol; or configured; or 13
14 determined by a User Equipment (UE) based on a Prioritized Bit Rate (PBR) of each logical channel and an amount of data that is available for transmission on each logical channel.

4. The method according to claim 2, further comprising:
for each logical channel participating in a MAC PDU multiplexing among all logical channels, reducing a logical channel token value of the logical channel; and
reducing the logical channel token value of each logical channel participating in the MAC PDU multiplexing additionally, in response to a size of the transmission resource being greater than an amount of data that is available for transmission;
wherein the amount of data that is available for transmission refers to a total amount of data that is available for transmission in all logical channels participating in MAC PDU multiplexing.

5. The method according to claim 4, wherein said reducing the logical channel token value of each logical channel participating in the MAC PDU multiplexing additionally comprises:
determining a total amount of the additionally subtracted logical channel token values of all logical channels participating in the MAC PDU multiplexing as a difference between the size of the transmission resource and the amount of data that is available for transmission.

6. The method according to claim 5, further comprising:
for each logical channel among all logical channels participating in the MAC PDU multiplexing, determining the additionally subtracted logical channel token value of the logical channel as a quotient between the total amount of logical channel token values and channel numbers of the all logical channels.

7. The method according to claim 5, wherein for each logical channel among all logical channels participating in the MAC PDU multiplexing, the additionally subtracted logical channel token value of each logical channel decreases as the logical channel token value of the logical channel participating in the MAC PDU multiplexing increases.

8. The method according to claim 5, wherein said performing the LCP procedure based on the selected transmission target comprises:
performing the LCP procedure for a logical channel associated with the selected transmission target.

9. The method according to claim 1, wherein said selecting the transmission target based on the logical channel priority and the logical channel token value comprises:
among all logical channels which have data that is available for transmission, selecting a Destination associated with a logical channel with the highest priority and whose logical channel token value is greater than X as the transmission target, wherein X≥0.

10. The method according to claim 9, wherein a value of X is:
predefined by a protocol; or
configured; or
determined by a User Equipment (UE) based on a Prioritized Bit Rate (PBR) of each logical channel and an amount of data that is available for transmission on each logical channel.

11. A non-transitory storage medium storing one or more programs, the one or more programs comprising computer instructions, which, when executed by a processor, cause the processor to:

select a transmission target based on a logical channel priority and a logical channel token value, wherein the transmission target comprises a Destination, and the logical channel token value is a variable Bj; and
perform the LCP procedure based on the selected transmission target.

12. The non-transitory storage medium according to claim 11, wherein the transmission target further comprises a transmission resource, and the transmission resource is used for transmitting a Medium Access Control (MAC) Protocol Data Unit (PDU), and said selecting the transmission target based on the logical channel priority and the logical channel token value comprises:
selecting a transmission resource, which can transmit following logical channel with the highest priority, having data that is available for transmission, and whose logical channel token value is greater than X, as the transmission target, wherein X≥0.

13. The non-transitory storage medium according to claim 12, wherein a value of X is:
predefined by a protocol; or
configured; or
determined by a User Equipment (UE) based on a Prioritized Bit Rate (PBR) of each logical channel and an amount of data that is available for transmission on each logical channel.

14. The non-transitory storage medium according to claim 12, wherein the processor is further caused to:
for each logical channel participating in a MAC PDU multiplexing among all logical channels, reduce a logical channel token value of the logical channel; and
reduce the logical channel token value of each logical channel participating in the MAC PDU multiplexing additionally, in response to a size of the transmission resource being greater than an amount of data that is available for transmission;
wherein the amount of data that is available for transmission refers to a total amount of data that is available for transmission in all logical channels participating in MAC PDU multiplexing.

15. The non-transitory storage medium according to claim 14, wherein said reducing the logical channel token value of each logical channel participating in the MAC PDU multiplexing additionally comprises:
determining a total amount of the additionally subtracted logical channel token values of all logical channels participating in the MAC PDU multiplexing as a difference between the size of the transmission resource and the amount of data that is available for transmission.

16. The non-transitory storage medium according to claim 15, wherein the processor is further caused to:
for each logical channel among all logical channels participating in the MAC PDU multiplexing, determine the additionally subtracted logical channel token value of the logical channel as a quotient between the total amount of logical channel token values and channel numbers of the all logical channels.

17. The non-transitory storage medium according to claim 15, wherein for each logical channel among all logical channels participating in the MAC PDU multiplexing, the additionally subtracted logical channel token value of each logical channel decreases as the logical channel token value of the logical channel participating in the MAC PDU multiplexing increases.

18. The non-transitory storage medium according to claim 15, wherein said performing the LCP procedure based on the selected transmission target comprises:

performing the LCP procedure for a logical channel associated with the selected transmission target.

19. The non-transitory storage medium according to claim 11, wherein said selecting the transmission target based on the logical channel priority and the logical channel token value comprises:

among all logical channels which have data that is available for transmission, selecting a Destination associated with a logical channel with the highest priority and whose logical channel token value is greater than X as the transmission target, wherein $X \geq 0$.

20. A terminal comprising a memory and a processor, wherein the memory stores one or more programs, the one or more programs comprising computer instructions, which, when executed by the processor, cause the processor to:

select a transmission target based on a logical channel priority and a logical channel token value, wherein the transmission target comprises a Destination, and the logical channel token value is a variable Bj; and perform the LCP procedure based on the selected transmission target.

\*   \*   \*   \*   \*